United States Patent [19]
Bennett

[15] 3,665,784
[45] May 30, 1972

[54] REMOTE CONTROL ASSEMBLY
[72] Inventor: William G. Bennett, Troy, Mich.
[73] Assignee: Teleflex, Inc., North Wales, Pa.
[22] Filed: Oct. 8, 1970
[21] Appl. No.: 79,053

[52] U.S. Cl. ............................................. 74/501, 285/302
[51] Int. Cl. ......................................................... F16c 1/22
[58] Field of Search ................... 74/501 P, 501, 502; 236/31; 285/302; 64/8; 73/321, 318

[56] References Cited

UNITED STATES PATENTS

| 2,847,872 | 8/1958 | Todd | 74/501 UX |
| 1,833,040 | 11/1931 | Rader | 285/302 |
| 3,405,567 | 10/1968 | Houk | 74/502 |

Primary Examiner—William E. Wayner
Attorney—McGlynn, Reising, Milton & Ethington

[57] ABSTRACT

A motion transmitting remote control assembly including a conduit and a motion transmitting core element movably supported by the conduit. A terminal means is attached to one end of the core element and is adapted for attachment to a member to be controlled and normally moves with the core element but may move relative to the core element longitudinally of the core element in response to a predetermined force to automatically adjust the effective length of the core element. In one embodiment the core element has loops therein in frictional engagement with an organic polymeric terminal means and in another embodiment the core element has ratchet teeth on the end thereof in engagement with ratcheting teeth on the terminal means.

17 Claims, 4 Drawing Figures

Patented May 30, 1972 3,665,784
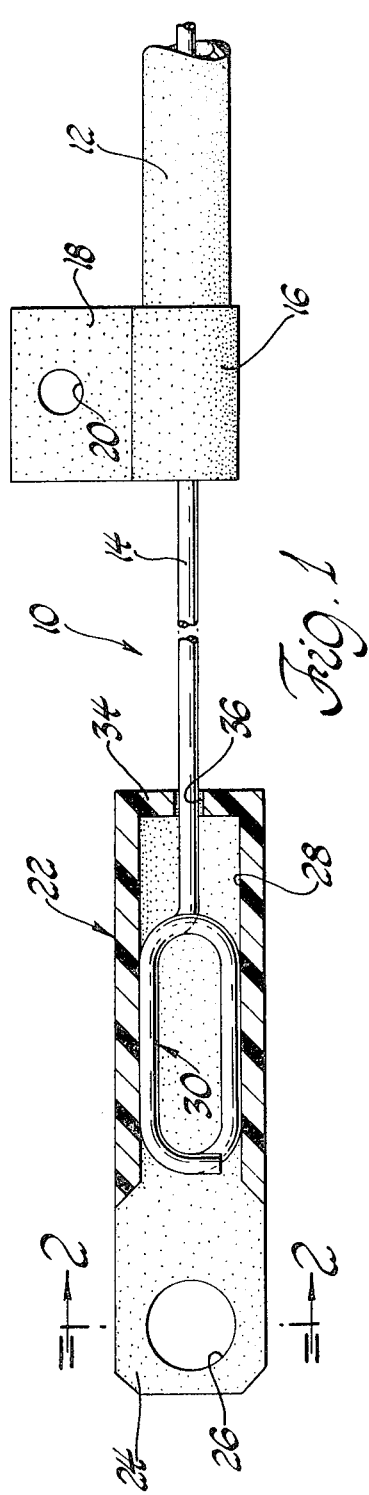
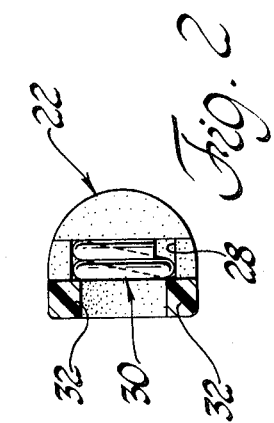
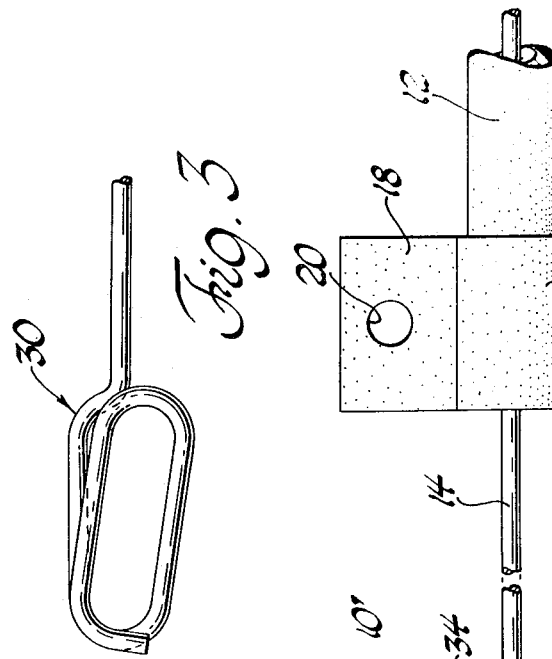
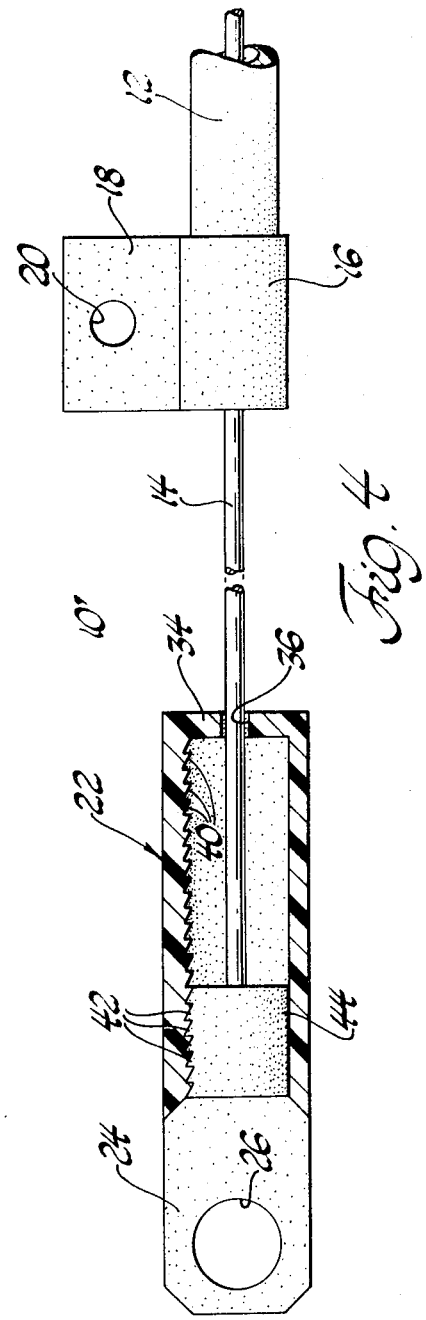
INVENTOR.
William G. Bennett
BY
Barnard, McGlynn & Reising
ATTORNEYS

REMOTE CONTROL ASSEMBLY

This invention relates to a flexible motion transmitting remote control assembly of the the type wherein motion is transmitted in a curved path by a flexible motion transmitting core element movably supported by a flexible conduit.

Remote control assemblies of the instant type are utilized in aircraft, automotive and marine environments. Typical of the use of such remote control assemblies is the positioning of heater and vent control members in automobiles.

In such applications, it is frequently desirable to adjust the length or the position of the end of the core element once the assembly is installed. Such assemblies normally include one or more fittings secured to the conduit for attaching the conduit to the support structure of the automobile and the core element is adapted at one end to be attached to a member to be controlled whereas the other end has a manually graspable knob secured thereto for longitudinally moving the core element. Frequently after the assembly has been installed, the member to be controlled may be moved to its extreme position by the end of the core element connected thereto yet the control knob is not at an extreme position. There are assemblies known to the prior art directed to the solution of this problem, as for example those shown in U.S. Pat. Nos. 3,289,491 and 339,578. However, such assemblies involve adjusting the length of the conduit which is in a curved path to adjust the amount the core element extends from the ends of the conduit. Very frequently, however, the conduit when installed is very short and/or extends along a straight path whereby the length of the conduit cannot be adjusted to adjust the effective length of the core element.

Accordingly, it is an object and feature of this invention to provide a motion transmitting remote control assembly including a motion transmitting core element movably supported by a conduit and terminal means associated with the core element for normally moving with the core element and for moving relative to the core element in response to a predetermined force.

Other objects and attendant advantages of the present invention will be readily appreciated as the same becomes better understood by reference to the following detailed description when considered in connection with the accompanying drawings wherein:

FIG. 1 is an elevational view partially in cross section of a preferred embodiment of the instant invention;

FIG. 2 is a cross section view taken substantially along line 2—2 of FIG. 1;

FIG. 3 is a fragmentary elevational view of the end of the motion transmitting core element utilized in the embodiment of FIGS. 1 and 2; and FIG. 4 is a fragmentary elevational view partially in cross section of another preferred embodiment of the instant invention.

Referring now to the drawings, a first preferred embodiment of a motion transmitting remote control assembly constructed in accordance with the instant invention is generally shown at 10 while a second preferred embodiment is shown at 10'.

Both embodiments include a conduit 12 and a motion transmitting core element 14 which is movably supported by the conduit 12. Also, a fitting 16 is secured to the conduit 12 and is adapted for attachment to support structure by a flange 18 having a hole 20 therein. Normally, a fitting 16 will be disposed at each end of the conduit 12 although in many environments it is only necessary to utilize a fitting or similar supporting means at one end of the conduit 12. The conduit 12 is preferably of the well-known type utilized in remote control assemblies and including an inner tubular member of organic polymeric material surrounded by a plurality of filaments or long-lay wires disposed on a long lead and encased in an outer jacket of organic polymeric material. The organic polymeric materials may be of various well-known plastics such as polyethylene, etc. Additionally, the fitting 16 is preferably of organic polymeric material and disposed about conduit 12.

Turning now to the embodiment 10 of FIGS. 1 through 3, the assembly includes a terminal means generally indicated at 22 for normally moving with the core element 14 and for moving relative to the core element 14 in response to a predetermined force. The terminal means 22 includes a connection means comprising the flange 24 having a hole 26 therein for connection to a member to be moved by the core element 14, or, conversely, to move the core element 14.

The terminal means 22 also includes attachment means comprising a channel 28 for operatively attaching the terminal means 22 to the core element 14 for allowing relative movement therebetween longitudinally of the core element 14 in response to a predetermined force.

More specifically, the core element 14 has at least one loop and, as illustrated, 1½ loops as generally indicated at 30. The loops 30 are disposed in the channel 28 and are in frictional engagement therewith and slide relative thereto in response to the predetermined force. The channel 28 engages opposite extremities of the loops 30 and includes lips 32 for retaining the loops 30 within the channel 28. Channel 28 is open at one end adjacent the flange 24 for allowing the loops 30 to be moved into the channel and is closed at the other end, as indicated at 34. The closed end 34 has an opening 36 therein through which the core element 14 extends.

As best illustrated in FIG. 3, the loops 30 are elongated and are normally offset from one another in the natural condition so that the loops are biased into and held in alignment with one another when disposed in the channel as illustrated in FIGS. 1 and 2. Thus, the opposite extremities of the loops 30 are biased away from one another to engage the sides of the channel 28 so that the core element 14 is in frictional binding engagement with the terminal means 22. It will be appreciated that instead of using elongated loops as illustrated, the loops may take various other configurations such as being circular. The terminal means 22 is preferably made of organic polymeric material such as nylon or polyethylene and has, to some degree, inherent resiliency. In other words, the side walls of the channel 28 are capable of flexing outwardly in response to the insertion of the loops 30.

In operation, the remote control assembly 10 is installed by attaching a fitting, such as that shown at 16, to a support structure and attaching the terminal means 22 to a member to be controlled by disposing the member in the hole 26. In many of the assemblies, the opposite end of the core element 14 will have a knob attached thereto for manually longitudinally moving the flexible metal wire-like core element 14. The member to be controlled, which is disposed in the hole 26, does not offer resistance to movement sufficient to cause relative movement between a terminal means 22 and the core element 14. However, should the terminal means 22 be moved to the left as viewed in FIG. 1 a sufficient distance that the member disposed in hole 26 is moved to its extreme position to the left, and therefore bottoms out and can move no further, while the control knob at the other end of the assembly has not fully moved to its extreme left position, a predetermined force may be applied to continually push the knob to the left so that the loops 30 of the core element will move along and relative to the terminal means 32; thus, adjusting the overall effective length of the core element. Once this adjustment has been made, the member to be controlled, which is disposed in the hole 26, may be moved back and forth without relative movement between the core element 14 and the terminal means 22 because the forces normally required for such movement of the member to be controlled are not sufficient to cause such relative movement between the core element and the terminal means 22.

The embodiment 10' illustrated in FIG. 4 differs from the first embodiment in that there are included coacting irregularities between the core element 14 and the terminal means 22. More specifically, the coacting irregularities comprise ratcheting teeth 40 and 42 for allowing relative movement between the core element 14 and the terminal means 22 only in one direction longitudinally of the core element 14. A plurality of the ratcheting teeth 40 are disposed along one wall of the channel 28. A block-like member 44, preferably of organic polymeric material, is secured to the end of the core element 14 and includes the ratcheting teeth 42 thereon for coacting with the ratcheting teeth 40 of the terminal means 22. As will be appreciated, the ratcheting teeth 40 and 42 may take various forms although they are illustrated as being inclined in one direction and having walls transverse to the longitudinal axis of the core element in the opposite direction to allow the member 44 to move to the right relative to the terminal means 22, as viewed in FIG. 4, and to prevent such relative movement in the opposite direction. Of course, the ratcheting teeth may be reversed to allow one-way movement in the opposite direction between the terminal means 22 and the member 44. Otherwise, the embodiment 10' of FIG. 4 includes the same components and structural detail and functions as the embodiment 10 of FIGS. 1 through 3.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a conduit, a motion transmitting core element movably supported by and moveable longitudinally within said conduit to thereby transmit motion, and terminal means for normally moving with said core element, said terminal means including attachment means for operatively attaching said terminal means to said core element for allowing relative movement therebetween longitudinally of said core element only in response to a predetermined force applied in a direction parallel to the axis of the core element.

2. An assembly as set forth in claim 1 wherein said terminal means includes connection means for connection to a member.

3. An assembly as set forth in claim 1 wherein said attachment means is in frictional engagement with said core element and slides relative thereto in response to said predetermined force.

4. An assembly as set forth in claim 4 wherein said core element has at least one loop therein and said attachment means engages opposite extremities of said loop.

5. An assembly as set forth in claim 5 wherein said attachment means comprises a channel in which said loop is disposed.

6. An assembly as set forth in claim 6 wherein said channel is closed at one end for preventing said loop from moving therepast.

7. An assembly as set forth in claim 7 including more than one of said loops with each loop being elongated.

8. An assembly as set forth in claim 8 wherein said loops are biased into and held in alignment when disposed in said channel.

9. An assembly as set forth in claim 9 wherein said core element is defined by a metal wire-like element, and including at least one fitting secured to said conduit for attaching said conduit to support structure.

10. An assembly as set forth in claim 1 wherein said core element and said attachment means include coacting irregularities.

11. An assembly as set forth in claim 11 wherein said coacting irregularities comprise ratcheting teeth for allowing said relative movement in only one direction longitudinally of said core element.

12. An assembly as set forth in claim 12 wherein said attachment means comprises a channel and said core element includes means defining at least one of said ratcheting teeth and disposed in said channel.

13. An assembly as set forth in claim 13 wherein said channel is closed at one end for preventing said last-mentioned means from moving therepast.

14. An assembly as set forth in claim 14 wherein said channel includes a plurality of said ratcheting teeth therealong.

15. An assembly as set forth in claim is wherein said core element is defined by a metal wire-like element, and including at least one fitting secured to said conduit for attaching said conduit to support structure.

16. A motion transmitting remote control assembly comprising: a conduit, a motion transmitting core element movably supported by and moveable longitudinally within said conduit to thereby transmit motion, and terminal means in frictional engagement with said core element so as to normally move with said core element and for moving relative to said core element in response to a predetermined force applied thereto in a direction generally parallel to the axis of said core element.

17. An assembly as set forth in claim 17 wherein said core element includes an enlarged portion in frictional engagement with said terminal means.

* * * * *

UNITED STATES PATENT OFFICE
CERTIFICATE OF CORRECTION

Patent No. 3,665,784          Dated May 30, 1972

Inventor(s) William G. Bennett

It is certified that error appears in the above-identified patent and that said Letters Patent are hereby corrected as shown below:

Column 1, line 4 after "the" (first occurrence) delete "the". Claim 11, line 1 "11" should be --10--. Claim 12, line 1 "12" should be --11--. Claim 13, line 1 "13" should be --12--. Claim 14, line 1 "14" should be --13--. Claim 15, line 1 "15" should be --14--. Claim 17, line 1 "17" should be --16--. Claim 4, line 1, "4" should be --3--; Claim 5, line 1, "5" should be --4--; Claim 6, line 1, "6" should be --5--; Claim 7, line 1, "7" should be --6--; Claim 8, line 1, "8" should be --7--; and Claim 9, line 1, "9" should be --8--.

Signed and sealed this 27th day of March 1973.

(SEAL)
Attest:

EDWARD M. FLETCHER, JR.          ROBERT GOTTSCHALK
Attesting Officer                Commissioner of Patents